United States Patent
Nguyen et al.

(10) Patent No.: US 9,386,303 B2
(45) Date of Patent: Jul. 5, 2016

(54) TRANSMITTING VIDEO AND SHARING CONTENT VIA A NETWORK USING MULTIPLE ENCODING TECHNIQUES

(71) Applicant: Personify, Inc., Chicago, IL (US)

(72) Inventors: Quang Nguyen, Ho Chi Minh (VN); Minh Do, Urbana, IL (US); Long Truong, Ho Chi Minh (VN); Dennis Lin, Chicago, IL (US); Sumant Kowshik, Champaign, IL (US); Sanjay Patel, Urbana, IL (US)

(73) Assignee: PERSONIFY, INC., Chicago, IL (US)

( * ) Notice: Subject to any disclaimer, the term of this patent is extended or adjusted under 35 U.S.C. 154(b) by 21 days.

(21) Appl. No.: 14/145,151

(22) Filed: Dec. 31, 2013

(65) Prior Publication Data

US 2015/0186744 A1    Jul. 2, 2015

(51) Int. Cl.
*G06K 9/00* (2006.01)
*H04N 19/00* (2014.01)

(52) U.S. Cl.
CPC ............................. *H04N 19/00* (2013.01)

(58) Field of Classification Search
None
See application file for complete search history.

(56) References Cited

U.S. PATENT DOCUMENTS

| | | |
|---|---|---|
| 5,001,558 A | 3/1991 | Burley et al. |
| 5,022,085 A | 6/1991 | Cok |
| 5,117,283 A | 5/1992 | Kroos et al. |
| 5,227,985 A | 7/1993 | DeMenthon |
| 5,343,311 A | 8/1994 | Morag et al. |
| 5,384,912 A * | 1/1995 | Ogrinc ............... G06F 17/175 345/501 |
| 5,506,946 A | 4/1996 | Bar et al. |
| 5,517,334 A | 5/1996 | Morag et al. |
| 5,534,917 A | 7/1996 | MacDougall |
| 5,563,988 A | 10/1996 | Maes et al. |
| 5,581,276 A | 12/1996 | Cipolla et al. |
| 5,631,697 A | 5/1997 | Nishimura et al. |
| 5,687,306 A | 11/1997 | Blank |
| 5,812,214 A | 9/1998 | Miller |
| 5,920,659 A * | 7/1999 | Iverson ............... G06T 3/40 345/50 |
| 5,995,672 A * | 11/1999 | Nagarajan ............ G06T 9/00 382/199 |
| 6,035,060 A * | 3/2000 | Chen ..................... H04N 9/75 348/E9.056 |
| 6,122,014 A * | 9/2000 | Panusopone ......... G06T 9/20 348/585 |
| 6,150,930 A | 11/2000 | Cooper |
| 6,411,744 B1 | 6/2002 | Edwards |
| 6,549,659 B1 | 4/2003 | Welch et al. |
| 6,618,444 B1 * | 9/2003 | Haskell ................ H04N 9/75 348/592 |
| 6,661,918 B1 | 12/2003 | Gordon et al. |
| 6,664,973 B1 | 12/2003 | Iwamoto et al. |
| 6,798,407 B1 | 9/2004 | Benman |
| 7,003,061 B2 | 2/2006 | Wilensky |
| 7,317,830 B1 | 1/2008 | Gordon et al. |
| 7,517,219 B2 | 4/2009 | McDonald et al. |

(Continued)

OTHER PUBLICATIONS

Background separation encoding—separation, Kitagawa et al., APSIPA, 2009, pp. 849-852.*

(Continued)

*Primary Examiner* — Jayesh A Patel
(74) *Attorney, Agent, or Firm* — Invention Mine LLC

(57) ABSTRACT

Embodiments disclose systems and methods for transmitting user-extracted video and content more efficiently by recognizing that user-extracted video provides the potential to treat parts of a single frame of a user-extracted video differently. An alpha mask of the image part of the user-extracted video is used when encoding the image part so that it retains a higher quality upon transmission than the remainder of the user-extracted video.

18 Claims, 9 Drawing Sheets

(56) References Cited

U.S. PATENT DOCUMENTS

| | | |
|---|---|---|
| 7,574,043 B2 | 8/2009 | Porikli |
| 7,633,511 B2 | 12/2009 | Shum et al. |
| 7,773,136 B2 | 8/2010 | Ohyama et al. |
| 8,094,928 B2 | 1/2012 | Graepel et al. |
| 8,175,384 B1 | 5/2012 | Wang |
| 8,300,890 B1 | 10/2012 | Gaikwad et al. |
| 8,320,666 B2 | 11/2012 | Gong |
| 8,379,101 B2 | 2/2013 | Mathe |
| 8,396,328 B2 | 3/2013 | Sandrew et al. |
| 8,411,149 B2 | 4/2013 | Maison et al. |
| 8,520,027 B2 | 8/2013 | Itkowitz et al. |
| 8,565,485 B2 | 10/2013 | Craig |
| 8,649,592 B2 | 2/2014 | Nguyen |
| 8,649,932 B2 | 2/2014 | Mian et al. |
| 8,659,658 B2 | 2/2014 | Vassigh et al. |
| 8,712,896 B2 | 4/2014 | Sheldon |
| 8,818,028 B2 | 8/2014 | Nguyen |
| 8,913,847 B2 | 12/2014 | Tang et al. |
| 2002/0158873 A1 | 10/2002 | Williamson |
| 2004/0153671 A1 | 8/2004 | Schuyler et al. |
| 2005/0094879 A1 | 5/2005 | Harville |
| 2005/0213853 A1* | 9/2005 | Maier .................. G06T 15/503 382/302 |
| 2007/0110298 A1 | 5/2007 | Graepel et al. |
| 2007/0146512 A1 | 6/2007 | Suzuki et al. |
| 2007/0201738 A1 | 8/2007 | Toda et al. |
| 2008/0181507 A1 | 7/2008 | Gope et al. |
| 2009/0110299 A1 | 4/2009 | Tehrani et al. |
| 2009/0244309 A1 | 10/2009 | Maison et al. |
| 2010/0195898 A1 | 8/2010 | Bang et al. |
| 2011/0064142 A1* | 3/2011 | Haskell .................. G09G 5/377 375/240.25 |
| 2011/0193939 A1 | 8/2011 | Vassigh et al. |
| 2011/0242277 A1 | 10/2011 | Do |
| 2011/0243430 A1 | 10/2011 | Hung et al. |
| 2011/0249190 A1 | 10/2011 | Nguyen |
| 2011/0267348 A1 | 11/2011 | Lin et al. |
| 2011/0293179 A1 | 12/2011 | Dikmen et al. |
| 2012/0011454 A1 | 1/2012 | Droz et al. |
| 2014/0028794 A1 | 1/2014 | Wu et al. |

OTHER PUBLICATIONS

D.S. Lee, "Effective Gaussian Mixture Leaning for Video Background Subtraction", IEEE, 6 pages, May 2005.

Benezeth et al., "Review and Evaluation of Commonly-Implemented Background Subtraction Algorithms", 4 pages, 2008.

Piccarrdi, "Background Subtraction Techniques: A Review", IEEE, 6 pages, 2004.

Cheung et al., "Robust Techniques for Background Subtraction in Urban Traffic Video", 11 pages, 2004.

Kolmogorov et al., "Bi-Layer Segmentation of Binocular Stereo Vision", IEEE, 7 pages, 2005.

Gvli et al., "Depth Keying", 2003, pp. 564-573.

Crabb et al., "Real-Time Foreground Segmentation via Range and Color Imaging", 4 pages, 2008.

Notification of Transmittal of the International Search Report and the Written Opinion of the International Searching Authority, or the Declaration, for PCT/US2014/047637, 11 pages.

* cited by examiner

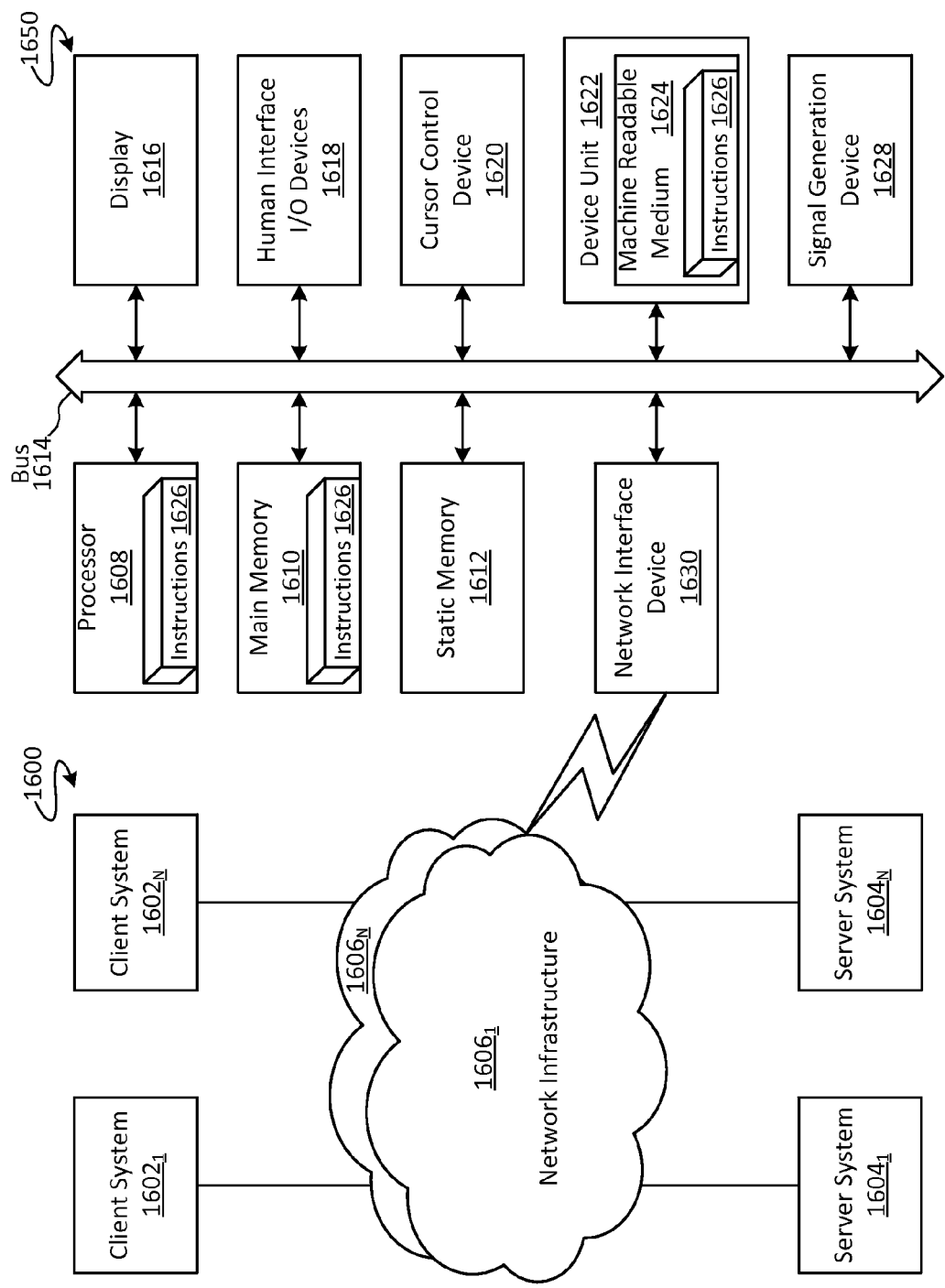

TRANSMITTING VIDEO AND SHARING CONTENT VIA A NETWORK USING MULTIPLE ENCODING TECHNIQUES

FIELD OF THE INVENTION

Embodiments of the present invention relate to transmitting video and sharing content via a network, and in particular, to more efficiently transmitting video and content via a network by transmitting them separately using optimized protocols.

BACKGROUND

Some video transmission systems merge video and content to be shared into one video stream. In such systems, the video stream may be transmitted using standard video codecs and streaming protocols. Upon receipt, the video and content are displayed for view on a web browser. These systems require no processing of the video stream at the viewer site aside from the processes related to receiving and displaying. Such systems typically treat the combined video and shared content similarly regarding methods of compression, transmission, reception, and display even though different methods may be more efficient or otherwise more suitable for each of the components that went into the video stream.

Where transmission systems send video and content separately, the video itself is typically transmitted using processes that treat the pixels of the video uniformly. Thus, such current transmission systems do not exploit the potential provided by user-extracted video to differentiate between an image part and a background part of the user-extracted video, or between an image part and a non-image part of a user-extracted video combined with another video or other content.

Also, current video transmission systems do not support the use of an alpha mask (also known as an "alpha channel"), though there have been efforts to modify current systems to support WebM video with an alpha channel for VP8 video.

SUMMARY

Embodiments of the claimed subject matter disclose methods and systems related to transmitting user-extracted video and content more efficiently. These embodiments recognize that user-extracted video provides the potential to treat parts of a single frame of the user-extracted video differently, e.g., the image part of the user-extracted video may be encoded to retain a higher quality upon decoding than the remainder of the user-extracted video. Such different treatment of the parts of a user-extracted video may allow more efficient transmission.

According to such embodiments, a user-extracted video is created along with an associated alpha-mask, which identifies the image part of the user-extracted video. If the image part is more important than the remainder of the user-extracted video, e.g., if it is a higher priority to have a high-resolution image part, it is processed for transmission using methods that preserve its quality or resolution in comparison to the remainder of the user-extracted video. During this processing the alpha mask is used to differentiate between the image part and the remainder of the user-extracted video. The processed video is then sent to a receiving computer.

In an embodiment, content is also selected and combined with the user-extracted video to create a composite video. During processing, the alpha mask is then used to differentiate between the image part and, in this embodiment, the remainder of the composite video.

In an embodiment, a chroma-key is employed to include the alpha mask in the encoded video. Dechroma-keying is then used to re-generate the alpha mask from the sent and decoded video. The re-generated alpha mask is used to determine an alpha value for each pixel of each frame of the decoded video, with the alpha value for a pixel being based on the difference between the pixel color in the decoded video and a key color. The alpha value is then used to determine whether to display that pixel color on the pixel.

In an embodiment, control information regarding a dynamic chroma-key is sent. The control information represents a dynamic chroma-key represents a key color that is not found within the associated image part of the video. This key color was used to replace the remainder of the associated user-extracted video. Should the image part of the video change and a pixel color changes to match the key color, a new key color is chosen to replace the remainder of the associated user-extracted video. The control information is then changed to represent the new key color.

BRIEF DESCRIPTION OF THE DRAWINGS

FIG. 16 illustrates an embodiment of a computer system and network system that incorporates foreground video embedding systems and methods.

DETAILED DESCRIPTION

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail. And the methods described within may be described in one order, but one of skill will realize the methods may be employed in a number of different orders.

Figure 1:
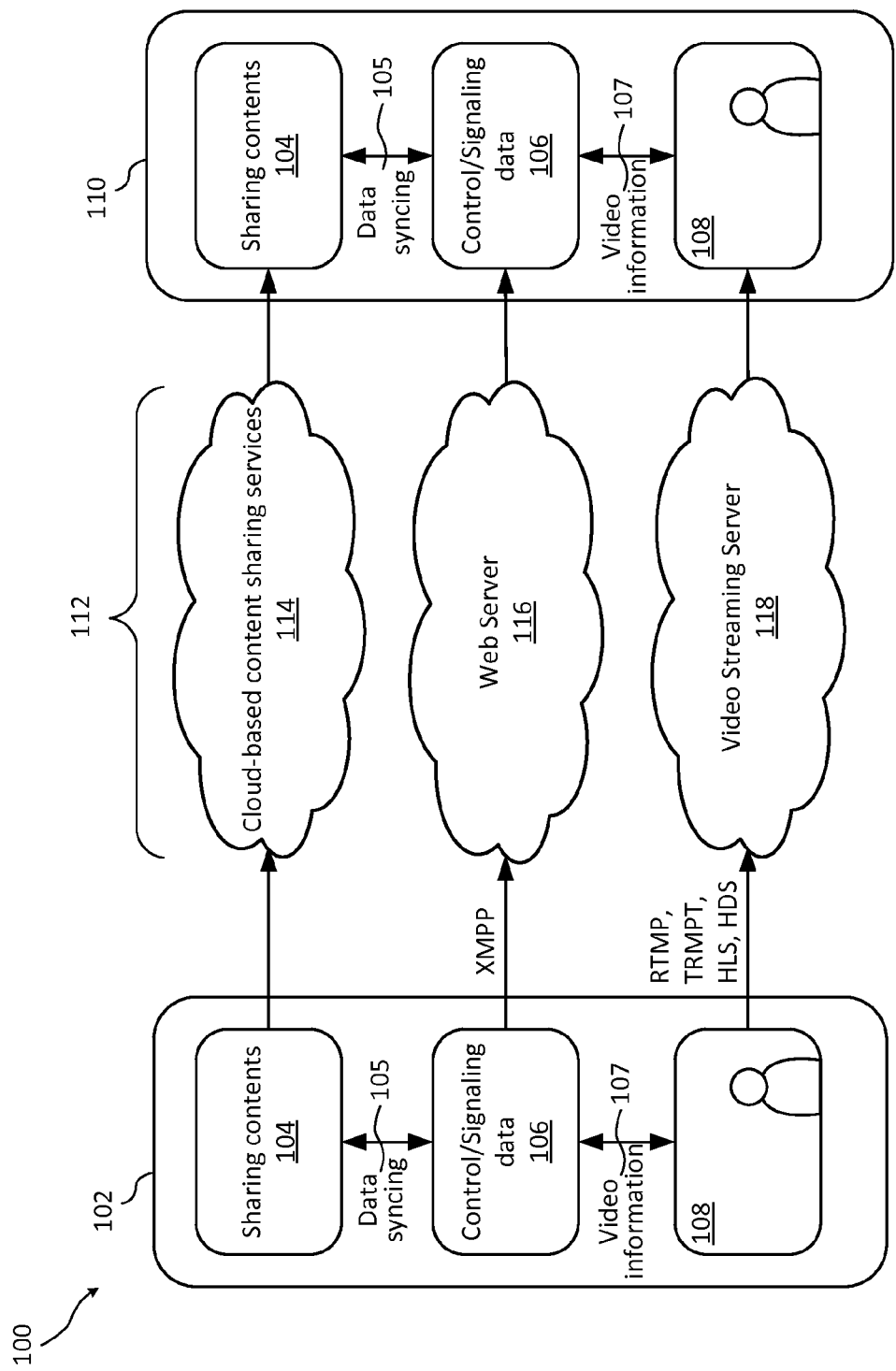
FIG. 1 illustrates a schematic diagram of an exemplary system according to some embodiments.

FIG. 1 illustrates a schematic diagram of an exemplary transmission system 100 according to some embodiments. In transmission system 100, sender 102 transmits content 104, control information 106, and video 108, to receiver 110. Content 104, control information 106, and video 108 are transmitted over network 112. However, the methods for transmitting content 104, control information 106, and video 108 may differ depending on, for example, the underlying data type. In the exemplary transmission system 100, content 104, which may include documents, video, or a desktop screen, for example, is shown being transmitted by cloud-based content sharing services 114, such as Google Docs™, MS Office 365™, Prezi™, or YouTube™. Control information 106 is shown being transmitted separately by XMPP web server 116. Control information 106 assists with presenting content 104 with video 108. Examples of control information 106 include information indicating whether the background of video 108 is to be displayed, and whether the video 108 is to be muted, which is facilitated by information exchange 107. In addition, should content 104 include a shared video, control information 106 may include information regarding which frame of the shared video is playing so that video players at sender 102 and receiver 110 play the same video frame at the same time, which is facilitated by information exchange 105. Further examples of control information 106 include information required to synchronize the display of content 104 with video 108, and information regarding the compression of content 104 and video 108. User-extracted video 108 is shown being transmitted separately by a video-streaming server 118. User-extracted video is discussed in more detail within regarding FIGS. 11-15.

Figure 2:
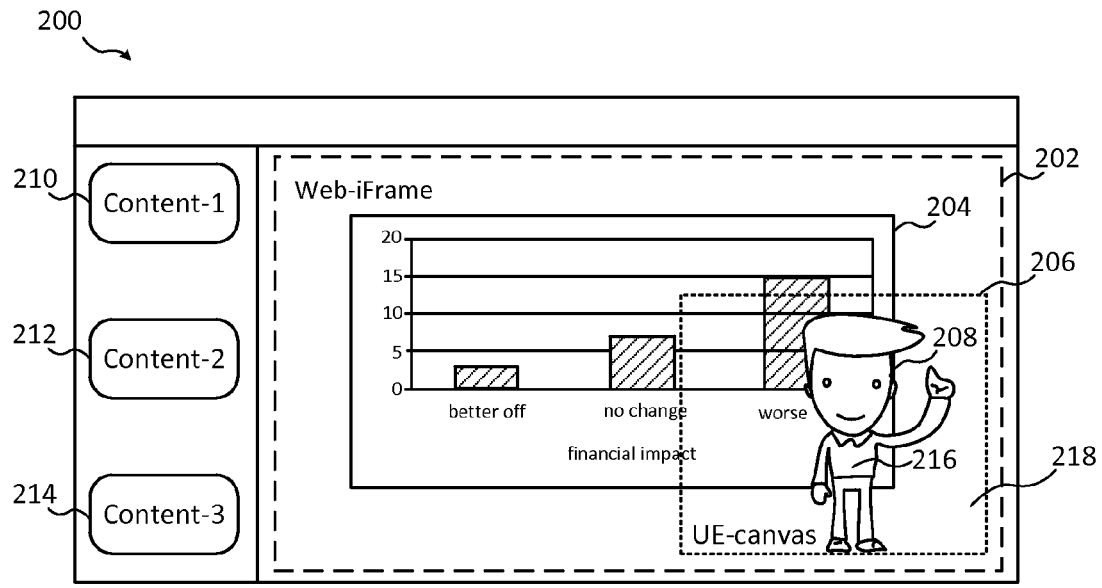
FIG. 2 illustrates an exemplary screen shot according to some embodiments.

In FIG. 1, receiver 110 receives content 104, control information 106, and user-extracted video 108. Receiver 110 processes content 104 and video 108 according to control information 106. An exemplary result of such processing is illustrated in FIG. 2.

Still regarding FIG. 1, user-extracted video 108 and shared content 104 may be streamed separately in different ways. This results in potentially three different types of transmitted data, with the differences between the data providing opportunities to individually tailor and optimize the transmission of each type separately from the others.

First, regarding user-extracted video data 108, chromakeying processing may be used to embed an alpha mask in the video frame. Such embedding is typically performed in real-time. An alpha mask represents a video frame using 0 or 1 for each pixel of that frame. Where the alpha mask contains a 0, that pixel is part of the background part of the user-extracted video. Where the alpha mask contains a 1, that pixel is part of the image part of the user-extracted video. An alpha mask is created during the extraction of the user from the video, which is discussed within. Video data 108 may then be compressed using a standard encoder or an encoder according to an embodiment ("Z-encoder," see the discussion of FIG. 4). Subsequently, video data 107 may be sent peer-to-peer or broadcast by a media streaming server using network application layer protocols such as Real-Time Transport Protocol (RTP), Real-Time Messaging Protocols (RTMP), Real-Time Messaging Protocols Tunneled (RTMPT), HTTP Live Streaming (HLS), or HTTP Dynamic Streaming (HDS).

Second, regarding control information 106, this information is used to synchronize the sharing of content between host/sender 102 and receiver/viewer 110 displays. For example, should content 106 be a document and have been sent ahead of video data 108, then control information 106 would need information necessary to synchronize the page number of the document with video data 108. Control information 106 also contains rendering information, (e.g., the relative position, size, and degree of transparency of the user-extracted video 108, for rendering that video with the shared content 104).

Third, regarding content 104, such content may include, (e.g., documents, photos, presentation slides, video clips, and web pages) which may be uploaded from, (e.g., a user computer), and also from shared cloud services like Google Docs™, Microsoft Office 365™, YouTube™, Vimeo™, and SlideShare™. By splitting the data and handling different video streams with codecs and protocols that are matched to, or optimized for, the specific streaming data (e.g., still image or video), various system embodiments help to minimize transmission bit rate requirements while retaining visual quality. Codecs and protocols may, for example, be optimized to improve the resolution and frame rate of video 108, since video typically contains movement. And codecs and protocols for content 104 may be optimized to improve content details. In embodiments, "smart" strategies are employed that automatically choose different protocols based on the type of data (e.g., video, document, etc.) being transmitted.

FIG. 1 illustrates the case where sender 102 is sending content 104 to receiver 110. In some embodiments, receiver 110 may then also create a user-extracted video and transmit that video to sender 102 using the same methods to create a video conference, with both sender 102 and receiver 110 viewing each other and themselves on the display in real time. Receiver 110 may also send content to sender 102. In additional embodiments, sender 102 and receiver 110 each create user-extracted videos, these videos are combined with content from either or both of sender 102 and receiver 110, both user-extracted videos and content are combined, and the combination is transmitted to a third party viewer. Sender 102 and receiver 110 would both need software to create and combine user-extracted videos and content, but either sender 102 or receiver 110 could send the combination to the third party viewer. The third party viewer may employ a typical web browser to view the combination. Software employed by sender 102 and receiver 110 may include Javascript, Flash, and plain implementation codes. In an embodiment, receiver 110 could receive user-extracted videos from multiple senders 102 and render all user-extracted videos received and created on shared content 104.

FIG. 2 illustrates an exemplary screen shot 200 according to some embodiments. In screen shot 200, content 104 is displayed in content frame 202. In this example, content 104 is a bar chart 204 entitled "financial impact." Video 108 is depicted by a user-extracted video 208 displayed in a canvas 206. In this example, video 108 includes an image part 216 and a background part 218. Background part 218 is depicted as being shaded for illustration purposes. In an actual screen shot, background part 218 may be transparent making image part 216 appear to be superimposed over bar chart 204. Control information 106, though not shown in FIG. 2, is used by receiver 110 to receive and display bar chart 204 and video 208. Content buttons 210, 212, and 214, indicate that receiver 110 may receive content from more than one receiver, or may receive different content from the same receiver. A user at receiver 110, through content buttons 210-214, may select and display the content individually or in any combination.

In some embodiments, the sender processing flow may be as follows. First, a user persona is extracted from a video (see FIGS. 11-15). Also, an alpha mask is created to define an image part and a background part of the user persona. And content may be selected for sharing. Then a dynamic chroma-keying technique is applied to the background part. With a dynamic chroma-keying technique, a color not initially found within the image part is used to replace the background part as defined by the alpha mask. Subsequently, should that initial "background" color be found in the image part, a new background color is chosen from the colors not appearing in the image part (see FIGS. 5-9 for further discussion). After chroma-keying, the image part and the background part are compressed for transmission. Because it is preferable to have a detailed image part, while the level of detail in the background part is of less importance, the image part may be compressed with methods that preserve more detail while losing smoothness of an object's motion. The background part may be compressed with methods that lose detail, (i.e., "lossy" methods, which generally lose detail but maintain smoothness of motion). Thus, using different compression techniques may decrease the bandwidth required to transmit the video while maintaining its overall quality. Information regarding the compression of the image and background parts is preferably included in the control information to facilitate accurate decoding. Control information is then created regarding the persona and content. Such control information preferably facilitates the transmission, reception, and display of the persona and content. And dynamic chroma-key information is added to the control information. Then the user persona, content, and control information are transmitted to a receiving computer. In some embodiments, the protocols for each are chosen to optimize the efficiency of transmission, which may result in reduced bandwidth and/or an improved resolution. This may not require entirely different protocols. For example, the content and persona are similar data types, and thus the same protocol may be used to transmit the persona and content. Then the persona and content are displayed according to the control information by the receiving computer.

Still regarding FIG. 2, content 104, combined with user-extracted video 108, may be displayed by a software client. However, since shared content on the cloud is usually rendered from web pages, web browsers may be used to process, blend, and display content 104 and video 108. In some embodiments, the receiver processing flow may be as follows. First, the user-extracted video stream 108 may be decoded and dechroma-keyed to extract the alpha mask. Second, the background pixels may be set to be transparent when the frame is rendered on a HTML5 canvas 206 (FIG. 2). Third, shared content 104 is displayed on a Web iFrame object 202 (FIG. 2) in a web page that viewers open on their web browsers. Finally, canvas 206, which contains video image part 208, is rendered on the top of the iFrame object 202. The location and size of the canvas is specified in the control information (control and signaling data) 106. Subsequently, additional canvasses containing additional video image parts may be rendered on top of iFrame object 202, depending on the number of users participating in the session.

Figure 3:
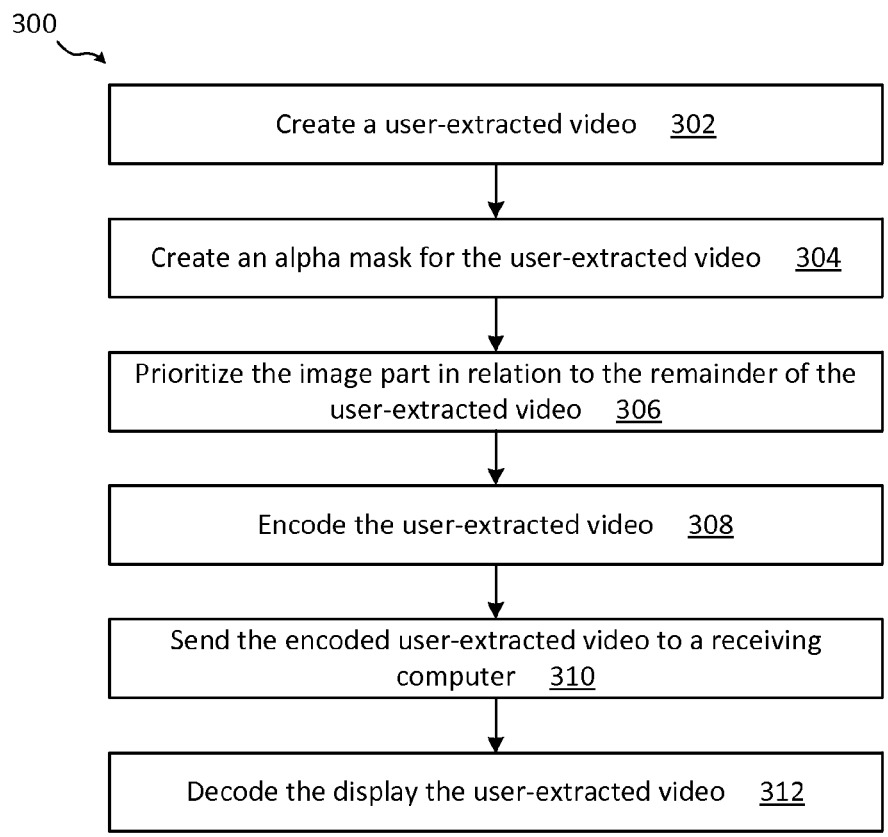
FIG. 3 illustrates a flow chart of a method according to some embodiments.

FIG. 3 illustrates a flow chart of a method 300 according to some embodiments. At 302, a user-extracted video is created. At 304, an alpha mask is created for the user-extracted video, with the alpha mask corresponding to the image part of the user-extracted video. At 306, the priority of the image part in relation to the remainder of the user-extracted video is determined. For example, if the image part is more important than the remainder of the user-extracted video, then the image part is given a higher priority. At 308, the user-extracted video is encoded. The encoding may use the alpha mask to encode the image part and the remainder of the user-extracted video differently based in part on the image part priority. At 310, the encoded user-extracted video is sent to a receiving computer. And, at 312, the received video is decoded and displayed.

In additional embodiments, the method 300 may further include the following. Content may be selected to accompany the user-extracted video. This content may be combined with the user-extracted video to create a composite video. In such a case, at 306, the priority of the image part would be determined in relation to the remainder of the composite video, at 308 the alpha mask would be used to encode the image part and the remainder of the composite video differently based in part on the priority of the image part, and at 310 the encoded composite video would be sent to the at least one receiving computer.

Figure 4:
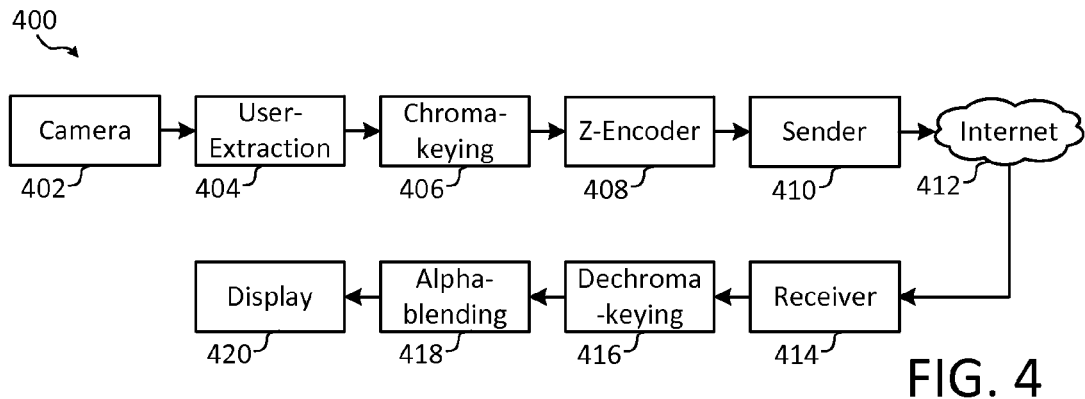
FIG. 4 illustrates a schematic diagram of a method according to some embodiments.

FIG. 4 illustrates a diagram of a method 400 according to some embodiments. At 402, a camera is used to produce a video of a user. At 404, the user is extracted from the video (see FIGS. 5-9 regarding user extraction). At 406, the user-extracted video is chroma-keyed based on an alpha mask to define an image part and a background part of the user-extracted video. At 408, an encoder may compress the user-extracted video, content, and control information, though control information is generally not compressed since it is relatively a very small amount of data. In an embodiment, a Z-encoder (see FIG. 9 and related discussion) compresses the image part and background part of the user-extracted video differently—preserving the quality of the image part to a greater extent than that of the background part. At 410, the user-extracted video, content, and control information, compressed or otherwise, are sent via network 412, using separate networking protocol individually suited to each, to receiver 414 for subsequent decoding. At 416, the user-extracted video is dechromakeyed and at 418, the dechromakeyed video is blended with content and, at 420, displayed.

Regarding step 408, in some embodiments, the background part is not displayed at the receiver. Thus, it would be inefficient for the whole video frame to be compressed and transmitted for subsequent discarding of the background part at the receiver. Embodiments disclosed herein mitigate this inefficiency by embedding alpha mask information in the color frame and then executing a chroma-keying technique to separate the video frame into an image part and a background part. In such embodiments, the background part may be encoded or transmitted differently (these include, for example, its not being encoded or transmitted at all). Such is the case, for example, with conferencing applications where only the user's image (and not their surrounding environment) is to be combined or shared for embedding with virtual content. This treatment of the background part saves bandwidth by not transmitting unnecessary pixel data.

Figure 5:
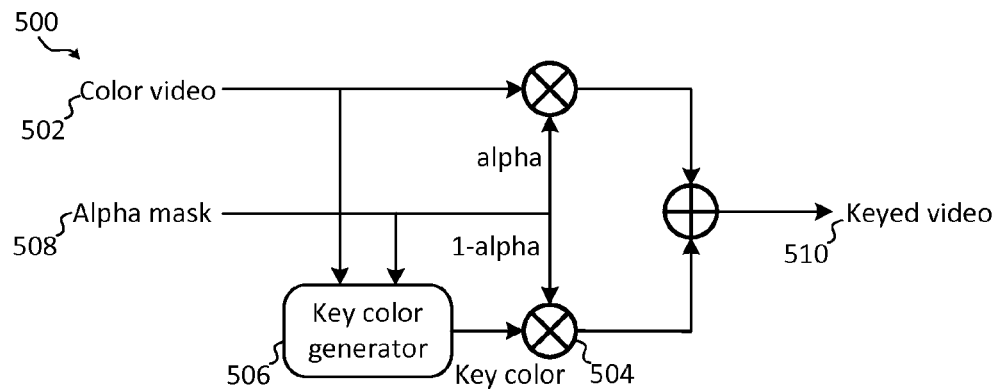
FIG. 5 illustrates a diagram of a chroma-keying method according to some embodiments.

FIG. 5 illustrates a diagram of a chroma-keying method according to some embodiments. Chroma-keying 500 replaces the background part 218 (FIG. 2) of the user-extracted video 502 by a key color 504 that is specified by a key color generator 506 within chroma-keying block 406. The background part 218, defined by an alpha mask 508, is generated from the user-extraction block 404 (FIG. 4). This produces a chroma-keyed video 510. If, at key color generator 506, the key color is not changed once chosen, then the chroma-keying technique is considered "static." If the key color is changed based on extracted video 502, then the chroma-keying technique is considered "dynamic."

The choice of key color preferably satisfies the following requirements: 1) no pixel in the foreground area has the same color as the key color; 2) there is some safe $L_1$ norm distance between the key color and the closest color in the foreground pixel; and 3) the key color does not require frequent change and is chosen to minimize the size of the encoded video packets. The safe $L_1$ norm distance is chosen based on considerations such as data type, compression methods, and decoding methods.

Regarding the second requirement 2), the reason for the safe distance $L_1$ is that after applying encoding to the video and sending through the network, (e.g., the Internet), the color values may not be preserved correctly when uncompressed and decoded into the video for display. Rather, the decoder may give out color values that are similar to, but not the same as, the uncompressed ones. Thus, the presence of a safe $L_1$ norm distance ensures that the decoded key color values of the background part are always separated from decoded color values of the image part (or foreground area) of the user-extracted video.

Almost all codecs, such as VP8 or H264, prefer the input video in YUV color space for the ease and efficiency of video compression. Thus, regarding the static chroma-key technique, to convert from RGB to YUV color space, a fixed-point approximation is applied in most digital implementations.

Since the value range of the output YUV is normally scaled to [16, 235], it is possible to use the {0, 0, 0} value for key color. This key color selection satisfies requirements 1-3, above. However, it is not always the case for all codec implementations that the range of YUV is limited to [16, 235]. In such cases, an embodiment proposes a dynamic chroma-key technique.

Figure 6:
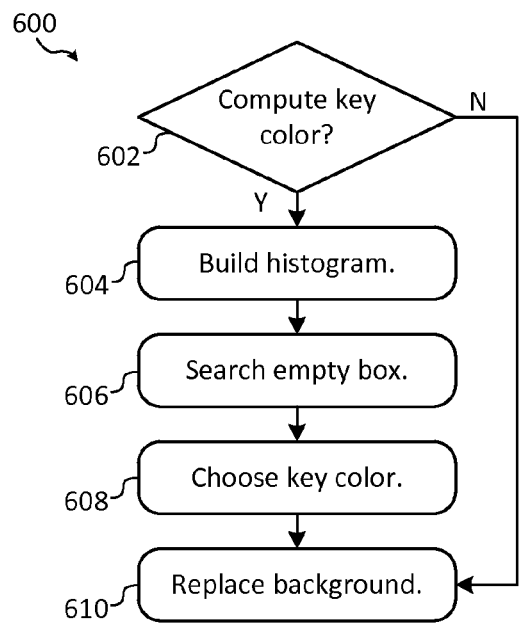
FIG. 6 illustrates a flow chart of a method for dynamic chroma-keying according to some embodiments.

FIG. 6 illustrates a flow chart of a method 600 for dynamic chroma-keying according to some embodiments. At 602, it is determined whether the key color needs to be recomputed and changed. Such a change is made in the key frame when encoding 408 (FIG. 4). The decision to recompute is made if there is less than the safe $L_1$ norm distance between the key color and a color in the image part of the user-extracted video. If the safe distance is maintained, (i.e., "N" or "do not compute key color"), then, at 610, the background part is replaced using the initial key color. If the safe distance is not maintained and a new key color is required, then, at 604, a determination of the colors present in the video frame is made. In some embodiments, a 3D YUV histogram of the colors is build. At 606, the histogram is searched for the presence of an "empty box" that signifies an area of color space that is not represented in the image part of the user-extracted video. Preferably, an empty box is a defined group of bins within the 3D YUV histogram that are all empty (no color points inside). Experimentally, a box with sides equal to or larger than 16×16×16 has been enough to differentiate between colors in the image (or foreground) and background parts of the user-extracted video. At 608, a key color is chosen from the "empty box." Preferably, the color key is the center of the empty box. And, at 610, the background part (or the value for the pixel that would be the background part) of the user-extracted video is replaced with the newly chosen key color.

Still regarding FIG. 6, should static chroma-keying be used, at 608 a key color is chosen, and at 610 the background is replaced.

Figure 7:
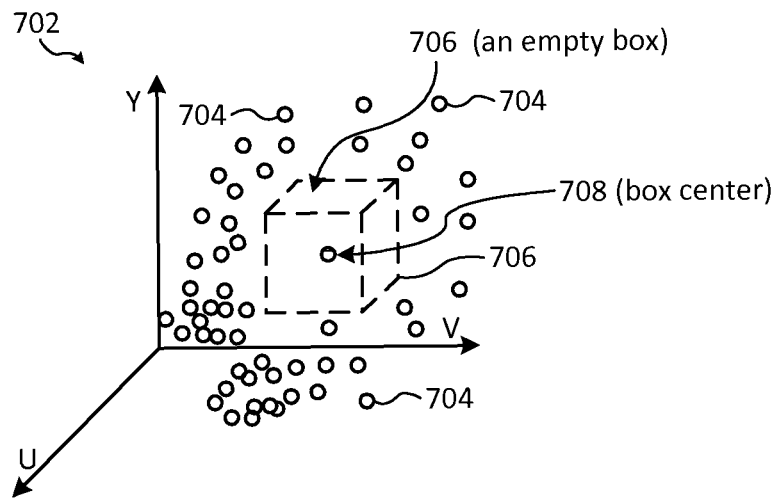
FIG. 7 illustrates a conceptual diagram illustrating aspects of dynamic chroma-keying according to some embodiments.

FIG. 7 illustrates a conceptual diagram illustrating aspects of dynamic chroma-keying according to some embodiments. In FIG. 7, a 3D YUV histogram 702 has been constructed regarding a hypothetical image part of a user-extracted video frame (not shown). Bins with color points inside are indicated by dots 704. An empty box 706 has been constructed about a color space in which the bins do not contain color points. The center 708 of empty box 706 is then a candidate for being chosen as the color key.

At 606, should no empty box of the chosen dimensions be found, the key color $\{y_k, u_k, v_k\}$ is chosen to minimize the expression:

$$E = \left( \sum_{y_i \in \delta_y[y_o]} \sum_{u_j \in \delta_u[u_o]} \sum_{v_k \in \delta_v[v_o]} w[y_o, u_o, v_o] * H[y_i, u_j, v_k] \right)$$

Where:
w is the weight of each bin depending on its distance from the center of the box;
$\delta_y, \delta_u, \delta_v$ is the neighborhood area in y, u, v axis, respectively; and
H[y,u,v] is the bin value of color {y,u,v}.

If, at 606, E>0, which means that there is at least one pixel value in the image part/foreground area that has its color inside the center box and its neighboring boxes, then that pixel color value is modified so that it no longer lies inside the box. This works to avoid ambiguity in dechroma-keying step.

Compared to the static chroma-key method, the dynamic chroma-key method requires more computation and bandwidth. Therefore, it is preferable to use the dynamic method only when the static method cannot be applied.

Figure 8:
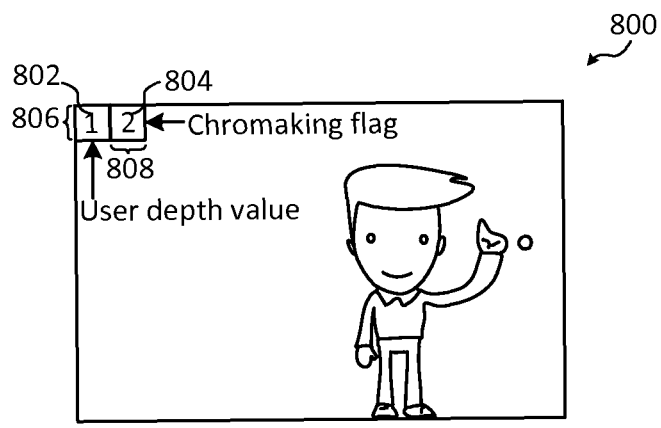
FIG. 8 illustrates an exemplary video frame depicting aspects of dynamic chroma-keying according to some embodiments.

FIG. 8 illustrates an exemplary video frame 800 depicting aspects of dynamic chroma-keying according to some embodiments. A quantized depth value 802 and a chroma-keying flag 804 are useful for rendering user-extracted video, and are preferably transmitted together with other user extraction information such as: fading level, user depth value, and background visibility (whether to show or not show background). Such information is grouped under the term, "side information." The depth value 802 is embedded in a macro block 806 and the chroma-keying flag 804 is embedded in a macro block 808. In an embodiment, a macro block is a 16×16 block of pixels. Macro blocks 806 and 808, located at the top left corner in each video frame, contain the depth value 802 and the chroma-keying flag 804. The value of all pixels in macro block 806 is the 255-level quantized depth value 802. Macro block 808 is used by the receiver to determine whether or not chroma-keying is applied. In some embodiments, to determine whether or not chroma-keying is applied, the receiver averages the value of all pixels inside the macro block and compares the average with the key color value. If the difference is significant enough, (e.g., past a threshold value), no chroma-keying is applied at the sender side to that frame. In this case, the sender transmits the background part of the video, and the receiver displays the background pixels.

Figure 9:
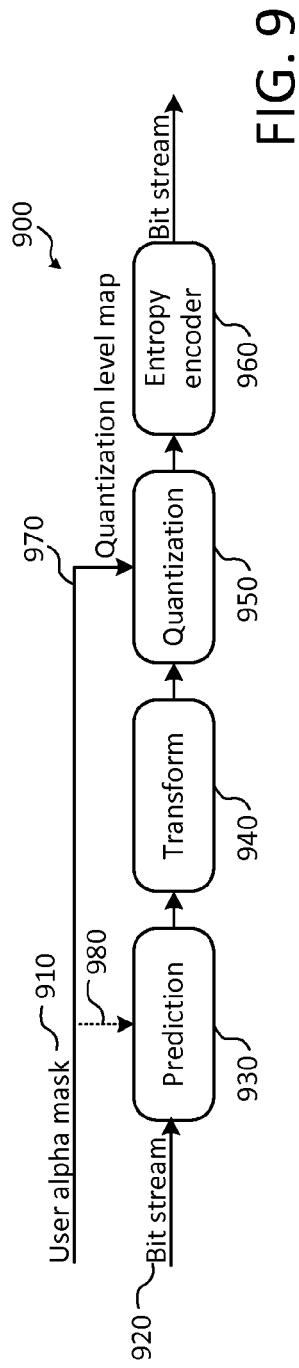
FIG. 9 illustrates a flowchart of an encoding method according to some embodiments.

FIG. 9 illustrates a flowchart of a z-encoding method 900 according to some embodiments. Z-encoder method 900 generally discloses encoding and saving bandwidth by: using an alpha mask 910 to guide a quantization block 950; and determining the differences between frames of video from chroma-keying block 406. The differences are then processed, compressed, and sent to the receiver 110 (FIG. 1). Receiver 110 can reproduce a current frame 920 given a previous frame (which it will already have) and the differences between the previous frame and the current frame. In Z-encoder method 900, a current video frame 920 from chroma-keying block 406 (FIG. 4) is divided into small macro blocks (typically 16×16 blocks of pixels). Current video frame 920 may, for example, be a composite video with both content and a user-extracted image, or a video of only a user-extracted image. Prediction block 930 determines the differences between the current video frame 920 and a previous frame (not shown) based on a block matching difference metric. In transform block 940, the difference information is transformed so that its energy (i.e., the amount of information) is compacted into a few data values. Typically, a discrete cosine transform (DCT) is applied in such a transformation. Quantization block 950 works to reduce the range of data values into a smaller number of possible values. For example, 16-bit color (with 65,536 possible values) can be quantized into 8-bit color (255 possible values). Such quantization does result in losing information regarding the video frame. Entropy encoder 960 is a lossless compression which compresses data even more. Prediction block 930, transform block 940, and quantization block 950, are designed to prepare the data from video frame 920 so that it is efficient for entropy encoder 960 to encode.

Regarding quantization block 950, at 970 an alpha mask 910 from the user-extraction process may be used to drive the quality of a quantization block 950 so that macro blocks in the user-image or user-extracted region of a video frame 920, i.e., the more important sections, are quantized with more bits than the background. Alpha mask 910 allows the encoder to identify the location of the image part 216 (FIG. 2) in the canvas 218. This information is added to the quantization block 950, allowing the encoder method 900 to avoid encoding blocks that do not contain elements of image part 216. This preserves the quality of the image part 216, or user region, during encoding. And by using fewer bits to quantize the background part (in the case of a video of a user-extracted image) or content (in the case of a composite video with content and a user-extracted image), it reduces the bandwidth required to transmit the encoded video stream. Skipping, (i.e., not encoding), the background part of a user-extracted video also saves additional processing time.

Efficiencies are gained in compression by addressing the different requirements of the content. When content is shared, the changes in content that accompany a change in video frame are typically small. In such case the Z-encoder may compress only those changes in the content following the method 900 described above with respect to video frame 920. In an additional embodiment, should it be determined that the background or content portion of video frame 920 is actually more important than the user-extracted image, then the alpha mask 910 from the user-extraction process may be used to drive the quality of a quantization block 950 so that macro blocks in the background or content region of a video frame 920 are quantized with more bits than the user-extracted image using the method described. And, in general, method 900 does not require that video frame 920 has gone through the chroma-keying process. Furthermore, in an embodiment, alpha mask 910 may be used to drive the quality of a quantization block 950 with the information from alpha mask 910 added through optional path 980 to prediction block 930.

Figure 10:
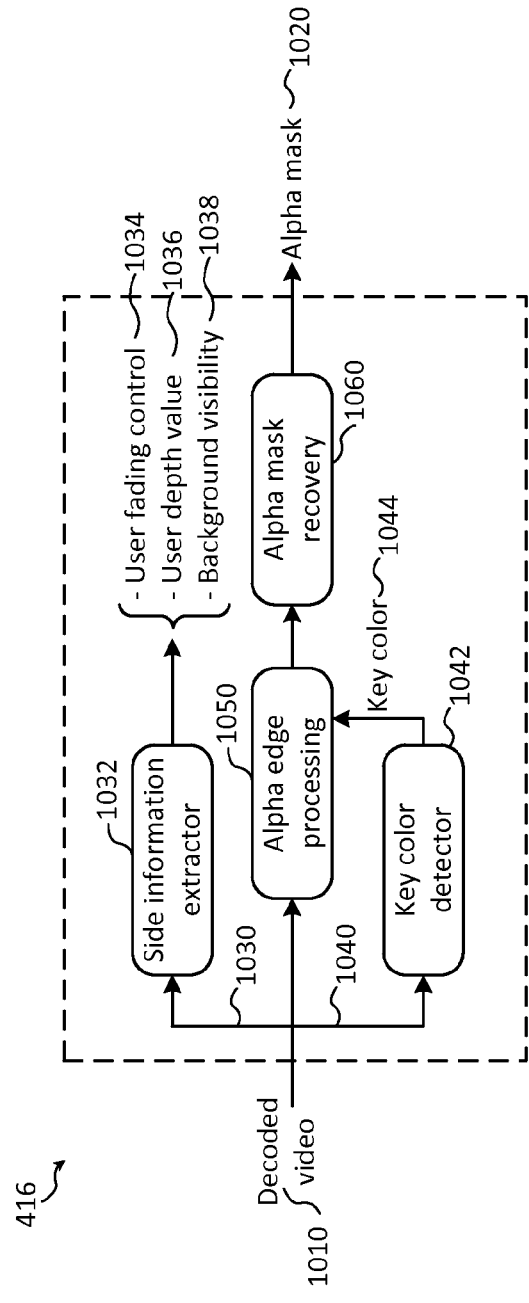
FIG. 10 illustrates a diagram of a dechroma-keying method according to some embodiments.

FIG. 10 illustrates a flow diagram of a dechroma-keying method 416 according to some embodiments. After being decoded by the receiver 414 (FIG. 4), the video 1010 is sent to dechroma-keying 416 (see also FIG. 4) to generate an alpha mask 1020 for each video frame. In the dechrom-keying method 416, at 1030, side information 1032 is extracted. Side information 1032 includes, for example, user fading control 1034, user depth value 1036, and background visibility control 1038. User fading control 1034 and user depth value 1036 may inform display block 420 (FIG. 4) how transparent to make the image of the user in decoded video 1010. The level of transparency may be determined based on the distance of the user from the video camera. Background visibility control 1038 informs display block 420 whether to display the background part of decoded video 1010. At 1040, key color detector block 1042 detects key color 1044. Then, at 1050, alpha mask recovery block 1052 determines the alpha value of each pixel in decoded video 1010 based on the difference between the pixel color value (not shown) and key color 1044. If the pixel color and key color 1044 are the same, the value of alpha mask 1020 is set to 0 for that pixel. This means that the pixel is considered a background part and is to be transparent when blending. If the pixel color and key color 1044 are different, the alpha value is set to 1. In an embodiment, the values for the pixel color and key color 1044 are considered to be different if their color values differ by more than a specified amount. At 1060, alpha mask edge processing is performed.

After dechroma-keying 416, the frame of decoded video 1010 and the generated alpha mask 1020 are sent to the alpha blending block 418 (FIG. 4) to make the image for display block 420. Alpha blending block 418 may combine decoded video 1010 with any additional content 104 (FIG. 1), or additional user-extracted video 108 (FIG. 1). Alpha mask 1020 contains an alpha value for each pixel of the decoded video frame that specifies how much the pixel color value contributes to the blended color value of the output display. Side information may be used to modify alpha mask 1020 according to control input from the user at the sender side. The alpha value may then range from 0 to 1 (or 0% to 100%). The alpha blending formula is as follows (where $C_{blended}$, $C_{video}$, and $C_{content}$ equal the color values of the blended pixel, video pixel, and content pixel, respectively):

$$C_{blended} = \alpha * C_{video} + (1-\alpha) * C_{content}$$

The following contains sample Javascript HTML5 code for implementing aspects of the embodiments, such as: streaming live video, initializing video and canvas sizes, and binding post-processing actions to video during streaming.

```
<script type = "text/javascript">
/***
 *Dechroma a streaming HTML5 video with deChromakey filter and render the
 * userExtraction (UE - with transparent background) into a Canvas using JavaScript
 * This Canvas is placed with absolute position over the web content using CSS.
 */
document.addEventListener('DOMContentLoaded', function( )
{
    /* Stream the Live video (rtmp, hls, hds...) */
    var html5Video = document.getElementById('html5Video'),
        cWidth = html5Video.clientWidth,
        cHeight = html5Video.clientHeight,
        UECanvas = document.getElementById('UECanvas'), /*Output the UE after dechromakey */
        UE = UECanvas.getContext('2d'),
        deChromaCanvas = document.createElement('canvas'),/* Use to run the dechromakey filter */
        deChroma = deChromaCanvas.getContext('2d'),
        deChromaRunner = null,
```

```
        deChromaInterval = 20,
        keyColor = {r:0, g:0, b:0, r_range:16, g_range:16, b_range:16}; /* key color */
    /* Init video & canvas, copy width and height to canvases */
    UECanvas.width = cWidth;
    UECanvas.height = cHeight;
    deChromaCanvas.width = cWidth;
    deChromaCanvas.height = cHeight;
    /* Binding post processing actions to html5Video during its streaming */
    html5Video.addEventListener('play', function( )
    {
        html5Video.style.visibility = 'hidden';
        clearInterval(deChromaRunner);
        deChromaRunner = setInterval(deChromakey,deChromaInterval,html5Video,UE,
            deChroma,keyColor,cWidth,cHeight);
    },false);
},false);
function deChromakey (html5Video,UE,deChroma,keyColor,cWidth,cHeight)
{
    if(html5Video.paused || html5Video.ended) return false;
    /* Step 1: copy current video frame to the deChromaCanvas */
    deChroma.drawImage(html5Video,0,0,cWidth,cHeight);
    /* Step 2: get the pixel data from the deChromaCanvas */
    var imageData = deChroma.getImageData(0,0,cWidth,cHeight);
    var data = imageData.data;
    /* Step 3: Loop through the pixels, make them transparent if they match keyColor */
    for(var i = 0; i < data.length; i+=4)
    {
        var r = data[i];
        var g = data[i+1];
        var b = data[i+2] ;
        if (Math.abs(r-keyColor.r)<=keyColor. r_range &&
            Math.abs(g-keyColor.g)<=keyColor.g_range &&
            Math.abs(b-keyColor.b)<=keyColor.b_range)
            data[i+3] = 0;
    }
    imageData.data = data;
    /* Step 4: Now render the userExtraction onto UE canvas */
    UE.putImageData(imageData,0,0);
}
</script>
```

Figure 11:
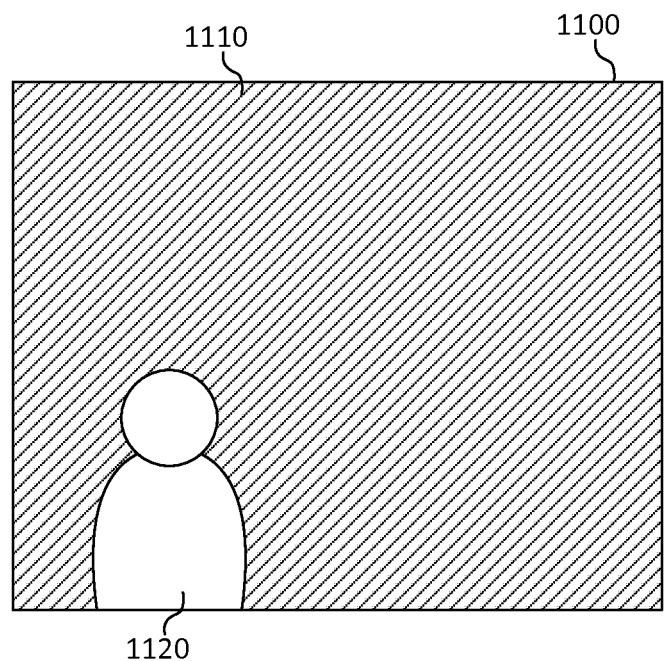
FIG. 11 illustrates an example video comprising a background portion and a foreground portion in accordance with some embodiments.

Creating a persona by extracting a user image from a video will now be described regarding FIGS. 11-14. FIG. 11 illustrates an example video 1100. In general, the example video 1100 comprises a background portion 1110 and a persona 1120. For example, the background portion 1110 may comprise a wall, outdoor scene, or any other background scene and the persona 1120 may comprise a human user or presenter. However, the persona 1120 may comprise any identifiable object or entity. Thus, the example video 1100 may be divided into at least two portions—a background 1110 and a persona 1120. For example, if the video 1100 comprises a user typing on a keyboard, then the user may comprise the persona 1120 and a wall of the room behind may comprise the background portion 1110.

Figure 12:
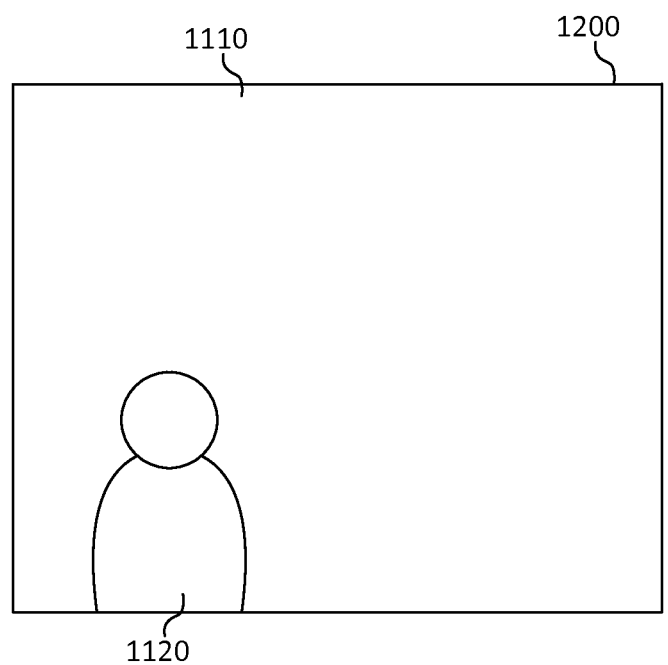
FIG. 12 illustrates an example video with the background portion subtracted or removed.

FIG. 12 illustrates an example foreground video 1200. In general, foreground video 1200 comprises a persona 1120 of the video 1100 with the background portion 1110 subtracted or removed. In this regard, foreground video 1200 approximates the video 1100 with the removal or subtraction of the background portion 1110. Persona 1120 may be selected as segments of foreground video 1200 of arbitrary length, including a single frame. A persona created from single foreground video frame may allow the user to convey an expression or body language, and a persona created from a video clip may allow the user to convey a gesture or action. These segments may be saved in foreground video libraries (not shown). During a chat session, persona 1120 may be created and viewed by the user, but not sent to other members of the chat session until directed to be associated with content by the user. That direction may take a number of forms. It may be a keystroke entry directly associated with sending a text, such as "enter." The direction may also be indirectly related to the sending of content. For example, a user could peruse through an existing library of personas to select an arbitrary section of a persona video or create a new persona.

Figure 13:
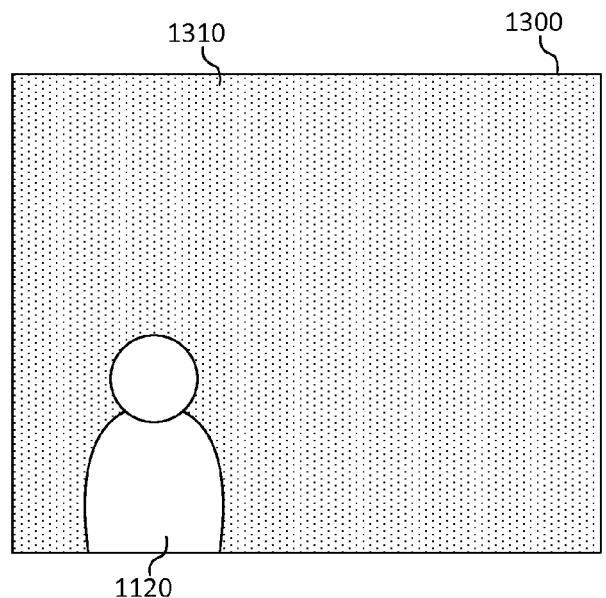
FIG. 13 illustrates an example composite video comprising a foreground video with a background feed in accordance with some embodiments.

FIG. 13 illustrates an example composite video 1300. In general, the composite video 1300 comprises the persona 1120 embedded within a background feed 1310. For example, the persona 1120 may comprise a single frame of a user and the background feed 1310 may comprise text. In some embodiments, the background feed 1310 may comprise any or all of an image, a presentation slide, web content, shared desktop, another video, pre-recorded video stream, live video stream, and/or a 3D virtual scene. And composite video 1300 may be of arbitrary length, including a single frame. In addition, composite video 1300 may be created by receiving persona 1120 and background feed 1310 from different sources. In such a case, persona 1120 would be sent to the receiver without a background feed 1310.

Figure 14:
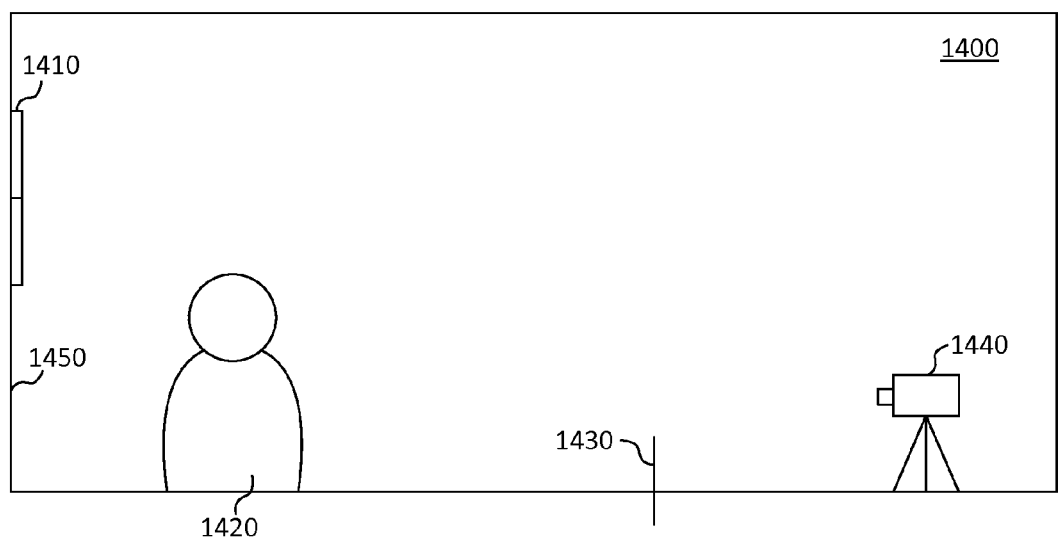
FIG. 14 illustrates an example setup comprising illustrates an example setup comprising a threshold for displaying the foreground video with the background feed in accordance with some embodiments.

FIG. 14 illustrates an example setup 1400 for displaying the foreground video frame with the background feed in accordance with some embodiments. As seen in FIG. 14, a setup 1400 may comprise a camera 1440 capable of receiving depth information and color information (e.g., a 3D camera). The setup 1400 may further comprise a user presenter 1420 in front of a wall or background 1450. In some embodiments, the camera 1440 may receive a depth and color video of the user presenter 1420 in front of the background 1450. The camera 1440, or a connected computer system as discussed in further detail below, may subtract or remove the background 1450 so as to create a foreground video. The foreground video may then be embedded into a background feed, and perhaps the background feed is shown on display 1410. For example, a single frame from the foreground video comprising a persona 1120 representing the user presenter 1420 may be embedded into text frame in a chat session.

Figure 15:
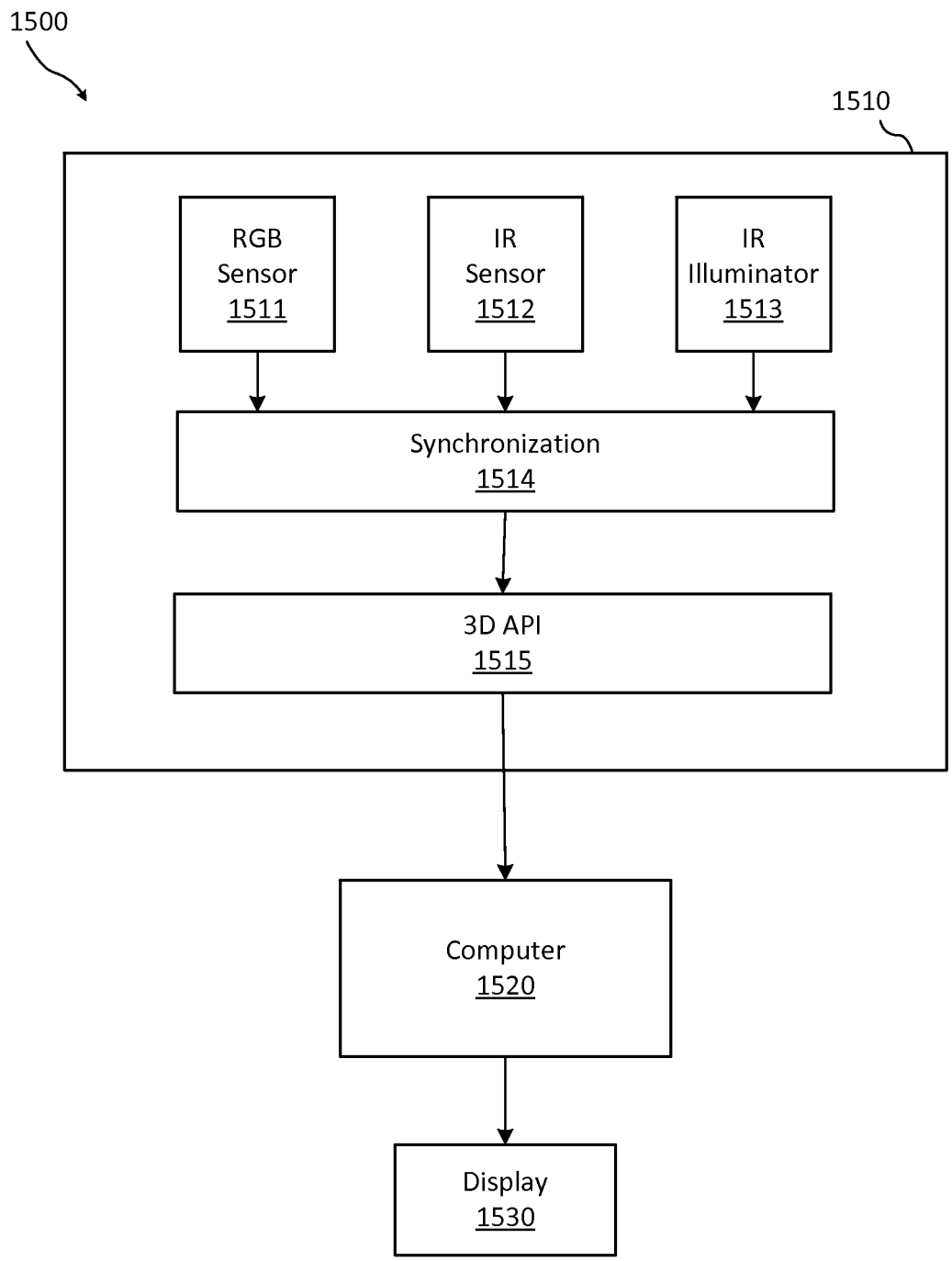
FIG. 15 illustrates an embodiment of a camera system for foreground video embedding in accordance with some embodiments.

FIG. 15 illustrates an embodiment of a camera system 1500 for the foreground video embedding systems and methods of the present embodiment. In general, the camera system 1500 comprises a camera 1510, computer 1520, and display 1530.

As seen in FIG. 15, a camera 1510 is connected to a computer 1520. The camera 1510 may comprise a three dimensional (3D) camera, depth camera, z-camera and/or range camera. In some embodiments, the camera 1510 may be comprised of a color or RGB camera and a depth camera or may comprise of a single camera with an RGB sensor and depth sensor. As such, the camera 1510 receives color information and depth information. The received color information may comprise information related to the color of each pixel of a video. In some embodiments, the color information is received from a Red-Green-Blue (RGB) sensor 1511. As such, the RGB sensor 1511 may capture the color pixel information in a scene of a captured video image. The camera 1510 may further comprise an infrared sensor 1512 and an infrared illuminator 1513. In some embodiments, the infrared illuminator 1513 may shine an infrared light through a lens of the camera 1510 onto a scene. As the scene is illuminated by the infrared light, the infrared light will bounce or reflect back to the camera 1510. The reflected infrared light is received by the infrared sensor 1512. The reflected light received by the infrared sensor results in depth information of the scene of the camera 1510. As such, objects within the scene or view of the camera 1510 may be illuminated by infrared light from the infrared illuminator 1513. The infrared light will reflect off of objects within the scene or view of the camera 1510 and the reflected infrared light will be directed towards the camera 1510. The infrared sensor 1512 may receive the reflected infrared light and determine a depth or distance of the objects within the scene or view of the camera 1510 based on the reflected infrared light.

In some embodiments, the camera 1510 may further comprise a synchronization module 1514 to temporally synchronize the information from the RGB sensor 1511, infrared sensor 1512, and infrared illuminator 1513. The synchronization module 1514 may be hardware and/or software embedded into the camera 1510. In some embodiments, the camera 1510 may further comprise a 3D application programming interface (API) for providing an input-output (IO) structure and interface to communicate the color and depth information to a computer system 1520. The computer system 1520 may process the received color and depth information and comprise and perform the systems and methods disclosed herein. In some embodiments, the computer system 1520 may display the foreground video embedded into the background feed onto a display screen 1530.

FIG. 16 is a diagrammatic representation of a network 1600, including nodes for client computer systems $1602_1$ through $1602_N$, nodes for server computer systems $1604_1$ through $1604_N$, nodes for network infrastructure $1606_1$ through $1606_N$, any of which nodes may comprise a machine 1650 within which a set of instructions for causing the machine to perform any one of the techniques discussed above may be executed. The embodiment shown is purely exemplary, and might be implemented in the context of one or more of the figures herein.

Any node of the network 1600 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In some embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1650 includes a processor 1608 (e.g. a processor core, a microprocessor, a computing device, etc.), a main memory 1610 and a static memory 1612, which communicate with each other via a bus 1614. The machine 1650 may further include a display unit 1616 that may comprise a touch-screen, or a liquid crystal display (LCD), or a light emitting diode (LED) display, or a cathode ray tube (CRT). As shown, the computer system 1650 also includes a human input/output (I/O) device 1618 (e.g. a keyboard, an alphanumeric keypad, etc.), a pointing device 1620 (e.g. a mouse, a touch screen, etc.), a drive unit 1622 (e.g. a disk drive unit, a CD/DVD drive, a tangible computer readable removable media drive, an SSD storage device, etc.), a signal generation device 1628 (e.g. a speaker, an audio output, etc.), and a network interface device 1630 (e.g. an Ethernet interface, a wired network interface, a wireless network interface, a propagated signal interface, etc.).

The drive unit 1622 includes a machine-readable medium 1624 on which is stored a set of instructions (i.e. software, firmware, middleware, etc.) 1626 embodying any one, or all, of the methodologies described above. The set of instructions 1626 is also shown to reside, completely or at least partially, within the main memory 1610 and/or within the processor 1608. The set of instructions 1626 may further be transmitted or received via the network interface device 1630 over the network bus 1614.

It is to be understood that embodiments may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present embodiment has been described in terms of specific exemplary embodiments, it will be appreciated that various modifications and alterations might be made by those skilled in the art without departing from the spirit and scope of the invention. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A computer-implemented method comprising:
   obtaining, with at least one computer, video data that comprises a defined foreground and a defined background;
   obtaining, with the at least one computer, an alpha mask for the video data, wherein the alpha mask identifies the defined foreground and the defined background;
   selecting, with the at least one computer, a chroma-key color, and modifying the defined background to be the same color as the selected chroma-key color, wherein the selected chroma-key color is a selected color not found in the defined foreground of a first frame of the video data, and when the defined foreground of a later frame of the video data includes the selected color, selecting a new color that is not found in the defined foreground of the later frame to be the chroma-key color;
   encoding, with the at least one computer, the video data, wherein the encoding uses the alpha mask to encode the defined foreground using a first encoding type and the defined background using a second encoding type; and
   sending, using the at least one computer, the encoded video data to at least one receiving computer.

2. The method of claim 1, further comprising selecting, with the at least one computer, content, wherein the defined background is at least a portion of the selected content.

3. The method of claim 1, further comprising:
   decoding, with the at least one receiving computer, the sent encoded video data;
   re-generating, with the at least one receiving computer, the alpha mask by dechroma-keying the decoded video data;
   determining, with the at least one receiving computer, an alpha value for a pixel of a frame of the decoded video data using the re-generated alpha mask; and
   displaying, with the at least one receiving computer, a pixel color of the pixel of the frame based at least in part on the alpha value.

4. The method of claim 3, wherein displaying the pixel color of the pixel of the frame comprises blending the pixel color of the pixel of the frame with a content-pixel color based at least in part on the alpha value.

5. The method of claim 1, wherein the first encoding type comprises quantizing with a first number of bits and the second encoding type comprises quantizing with a second number of bits, and wherein the first number is greater than the second number.

6. The method of claim 1, further comprising:
   receiving, using the at least one computer, second encoded video data from the at least one receiving computer;
   decoding, with the at least one computer, the second encoded video data; and
   displaying, with the at least one computer, the video data combined with the decoded second video data.

7. The method of claim 1, further comprising, sending, with the at least one computer, control information to the at least one receiving computer, the control information indicating at least one of a current chroma-key color, the first encoding type, the second encoding type, display-background preferences, volume preferences, and display-synchronization information.

8. A non-transitory computer readable storage medium storing one or more programs, the one or more programs comprising instructions for:
   obtaining, with at least one computer, video data that comprises a defined foreground and a defined background;
   obtaining, with the at least one computer, an alpha mask for the video data, wherein the alpha mask identifies the defined foreground and the defined background;
   selecting, with the at least one computer, a chroma-key color, and modifying the defined background to be the same color as the selected chroma-key color, wherein the chroma-key color is a selected color that is not found in the defined foreground of a first frame of the video data, and when the defined foreground of a later frame of the video data includes the selected color, selecting a color that is not found in the defined foreground of the later frame to be the chroma-key color;
   encoding, with the at least one computer, the video data, wherein the encoding uses the alpha mask to encode the defined foreground using a first encoding type and the defined background using a second encoding type; and
   sending, using the at least one computer, the encoded video data to at least one receiving computer.

9. The non-transitory computer readable storage medium of claim 8, further comprising instructions for selecting, with the at least one computer, content, wherein the defined background is at least a portion of the selected content.

10. The non-transitory computer readable storage medium of claim 8, wherein the first encoding type comprises quantizing with a first number of bits and the second encoding type comprises quantizing with a second number of bits, and wherein the first number is greater than the second number.

11. The non-transitory computer readable storage medium of claim 8, the storage medium comprising further instructions for:
    receiving, using the at least one computer, second encoded video data from the at least one receiving computer;
    decoding, with the at least one computer, the second encoded video data; and
    displaying, with the at least one computer, the video data combined with the decoded second video data.

12. The non-transitory computer readable storage medium of claim 8, further comprising instructions for sending, with the at least one computer, control information to the at least one receiving computer, the control information indicating at least one of a current chroma-key color, the first encoding type, the second encoding type, display-background preferences, volume preferences, and display-synchronization information.

13. A system comprising: at least one computer; and a non-transitory computer readable medium having stored thereon one or more programs, which when executed by the at least one computer, cause the at least one computer to:
    obtain video data that comprises a defined foreground and a defined background;
    obtain an alpha mask for the video data, wherein the alpha mask identifies the defined foreground and the defined background;
    select a chroma-key color, and modify the defined background to be the same color as the selected chroma-key color, wherein the chroma-key color is a selected color not found in the defined foreground of a first frame of the video data, and when the defined foreground of a later frame of the video data includes the selected color, selecting a color that is not found in the defined foreground of the later frame to be the chroma-key color;

encode the video data, wherein the encoding uses the alpha mask to encode the defined foreground using a first encoding type and the defined background using a second encoding type; and send the encoded video data to at least one receiving computer.

14. The system of claim 13, further comprising programs, which when executed by the at least one computer, cause the at least one computer to select content, wherein the defined background is at least a portion of the selected content.

15. The system of claim 13, further comprising the at least one receiving computer, the system further comprising programs, which when executed by the at least one receiving computer, cause the at least one receiving computer to:
  decode the sent encoded video data;
  re-generate the alpha mask by dechroma-keying the decoded video data;
  determine an alpha value for a pixel of a frame of the decoded video data using the re-generated alpha mask; and
  display a pixel color of the pixel of the frame based at least in part on the alpha value.

16. The system of claim 15, wherein the programs further cause the at least one receiving computer to blend the pixel color of the pixel of the frame with a content-pixel color based at least in part on the alpha value.

17. The system of claim 13, wherein the programs further cause the at least one computer to encode the video data by quantizing the defined foreground with a first number of bits and quantizing the defined background with a second number of bits, and wherein the first number of bits is greater than the second number of bits.

18. The system of claim 13, further comprising programs, which when executed by the at least one computer, cause the at least one computer to send control information to the at least one receiving computer, the control information indicating at least one of a current chroma-key color, the first encoding type, the second encoding type, display-background preferences, volume preferences, and display-synchronization information.

* * * * *